US012627677B2

(12) United States Patent
Kneib et al.

(10) Patent No.: US 12,627,677 B2
(45) Date of Patent: May 12, 2026

(54) TECHNIQUES FOR DETECTING AN INTRUSION INTO A BUS SYSTEM

(71) Applicant: Robert Bosch GmbH, Stuttgart (DE)

(72) Inventors: Marcel Kneib, Ingelheim (DE); Oleg Schell, Krautheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 534 days.

(21) Appl. No.: 17/941,296

(22) Filed: Sep. 9, 2022

(65) Prior Publication Data

US 2023/0094807 A1    Mar. 30, 2023

(30) Foreign Application Priority Data

Sep. 29, 2021    (DE) ..................... 10 2021 210 902.0

(51) Int. Cl.
  *H04L 9/40*        (2022.01)
  *H04L 12/40*      (2006.01)
(52) U.S. Cl.
  CPC .......... *H04L 63/1416* (2013.01); *H04L 12/40* (2013.01); *H04L 2012/40215* (2013.01)

(58) Field of Classification Search
  None
  See application file for complete search history.

(56) References Cited

U.S. PATENT DOCUMENTS

| | | | |
|---|---|---|---|
| 10,701,101 B2 * | 6/2020 | Soenkens ............ | H04L 63/1441 |
| 2015/0134865 A1 * | 5/2015 | Godau ............... | G05B 19/0428 |
| | | | 710/106 |
| 2022/0050440 A1 * | 2/2022 | Chen ..................... | H04L 47/826 |
| 2022/0262232 A1 * | 8/2022 | Sliskovic ............. | G08B 27/005 |
| 2022/0374515 A1 * | 11/2022 | Bridges ................. | G06F 21/554 |

* cited by examiner

*Primary Examiner* — Sanchit K Sarker

(74) *Attorney, Agent, or Firm* — NORTON ROSE FULBRIGHT US LLP

(57) ABSTRACT

A method for detecting the possibility of an intrusion into a bus system. The bus system includes a plurality of components which are able to transmit messages in the bus system. The method includes ascertaining a number of messages that are transmitted by a first component of the plurality of components in a specific time period; determining whether the number of messages in the specific time period satisfies a predefined first criterion; and detecting the possibility of an intrusion if the number of messages does not satisfy the predefined first criterion.

16 Claims, 5 Drawing Sheets

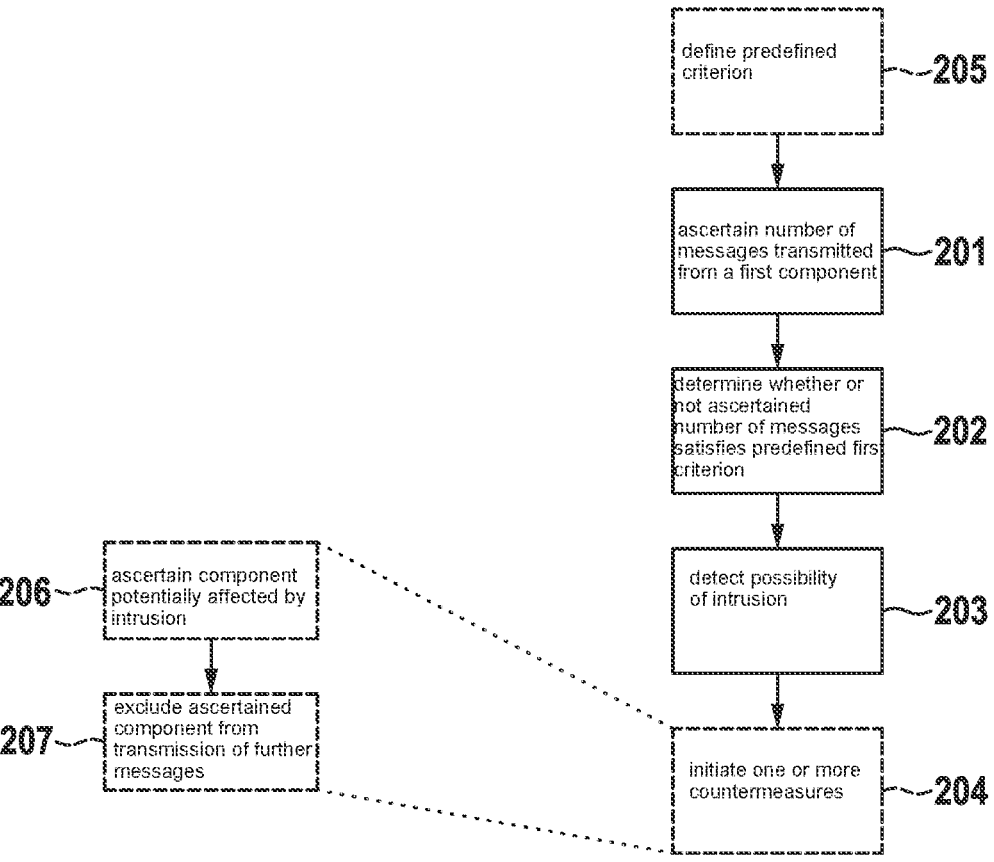

define predefined criterion — 205 ascertain number of messages transmitted from a first component — 201 determine whether or not ascertained number of messages satisfies predefined first criterion — 202

206 — ascertain component potentially affected by intrusion

207 — exclude ascertained component from transmission of further messages detect possibility of intrusion — 203 initiate one or more countermeasures — 204

Fig. 2

TECHNIQUES FOR DETECTING AN INTRUSION INTO A BUS SYSTEM

CROSS REFERENCE

The present application claims the benefit under 35 U.S.C. § 119 of German Patent Application No. DE 10 2021 210 902.0 filed on Sep. 29, 2021, which is expressly incorporated herein by reference in its entirety.

BACKGROUND INFORMATION

Modern vehicles (or other technical devices) are equipped to an ever greater degree with interfaces so that they can communicate with external systems during their operation or for updating purposes, for instance. At the same time, the complexity of the components grows steadily. Both make the vehicles more susceptible to attacks during which interference in the operation of the vehicle is possible in different ways.

One target of the attacks may be a bus system of the vehicle (or another technical device), for instance in an attempt to interfere with the function of the vehicle or one of its components by transmitting messages via the bus system. Typical bus systems in vehicles such as the widely used CAN bus system are often not adequately equipped to detect and avert such attacks.

In what is known as a 'denial-of-service attack', an intruder transmits messages, often in large numbers, via the bus system in order to interfere with a communication via the bus system.

To detect attacks, and especially denial-of-service attacks, multiple approaches have been proposed.

For one, an interval between two similar messages of a component of the bus system can be ascertained and compared to a reference value. This approach is based on the recognition that similar messages (i.e., messages of the same type) are typically transmitted in the bus system in a periodic fashion. If two messages of the same type are then detected in a shorter or a longer interval, a manipulation may be inferred.

In a related approach, a transmission frequency is determined for a type of messages. In this approach as well, the basic assumption is that messages of a certain type are transmitted on a regular basis and thus at a specific transmission frequency. An attack may once again be inferred if an ascertained frequency deviates from an expected frequency. For instance, the insertion of messages of the specific type can increase the transmission frequency.

So-called entropy-based approaches do not examine the transmission pattern of the messages across the bus system but their content. By determining an entropy of messages (or a part thereof), it is possible to ascertain the information content of the messages. Since an attacker often repeatedly transmits the same message or very similar messages, an entropy of the messages may drop during an attack.

SUMMARY

A first general aspect of the present disclosure relates to a method for detecting the possibility of an intrusion into a bus system. The bus system includes a plurality of components which are able to transmit messages in the bus system. According to an example embodiment of the present invention, the method includes an ascertainment of a number of messages transmitted by a first component of the plurality of components within a specific time period; determining whether the number of messages in the specific time period satisfies a predefined first criterion, and detecting the possibility of an intrusion if the number of messages does not satisfy the predefined first criterion.

A second general aspect of the present disclosure relates to a device for detecting the possibility of an intrusion into a bus system, the device being designed to carry out the steps of the method according to the first general aspect.

A third general aspect of the present invention relates to a bus system which includes a plurality of components which are able to transmit messages via the bus system, and to one or more devices for detecting the possibility of an intrusion into the bus system according to the second general aspect.

In some example embodiments of the present invention, the techniques of the first to the third aspects may offer one or more of the following advantages:

Firstly, the techniques of the present disclosure may make it possible to detect attacks on bus systems in some situations.

For instance, the comparison of a number of messages transmitted by a component (e.g., a control unit) to an expected number (as predefined criterion) may point to the presence of an attack (in a deviation between the ascertained and the expected number), but it can also indicate the opposite (when the ascertained number corresponds to the expected number).

Secondly, in some cases the techniques of the present disclosure may be superior to the previously mentioned techniques of the related art.

In comparison with the approach of monitoring the intervals between messages of the same type, the techniques of the present disclosure may require less overhead insofar as there is no need to configure and ascertain permissible intervals between the messages for a possibly large number of types of messages (e.g., five and up to 100 types of messages). In the techniques of the present disclosure, the number is ascertained for one component (e.g., a control unit). This is able to be realized by a lower number of parameters (for the definition of the predefined criterion), which can simplify both the configuration and the operation of a device for detecting the possibility of an intrusion into a bus system. For instance, an upper limit and a lower limit may be defined for the expected number of messages of a control unit and the actual number then be compared to the upper and lower limits during the operation. In contrast, a method which examines the intervals between messages of the same type would possibly have to define and monitor many intervals (such as dozens).

In addition, the allocation schemes in some bus systems, e.g., by prioritizations, may (intermittently) change the intervals between messages of the same type. This may lead to faulty triggering events of the interval-based method. By viewing a multitude (e.g., all) types of messages of a component, the techniques of the present disclosure may be less susceptible to changes in the intervals between certain types of messages (for instance because the number does not change to any significant extent when individual types of messages are transmitted less frequently).

Lastly, the approach of monitoring the intervals between messages of the same type may not handle irregularly (sporadically) transmitted messages satisfactorily in some cases because, as mentioned earlier, a periodicity of the messages is assumed. When examining the number of transmitted messages of a component, such irregularly (sporadically) transmitted messages are also able to be considered more easily in some instances.

In comparison with the techniques of monitoring a transmission frequency for a type of messages of the related art, the techniques of the present disclosure may partially offer similar advantages in certain situations. In some cases, it is particularly necessary to specify an expected transmission frequency for every type of message (which may be resource-intense). In addition, the detection of irregularly (sporadically) transmitted messages may be more difficult when using the approach of monitoring a transmission frequency for a type of messages than when employing the techniques of the present invention.

Attackers are able to infiltrate entropy-based methods by adapting the entropy of the illegally introduced messages to an expected entropy. The techniques of the present disclosure may be less susceptible to such manipulations because the number of messages of a component changes with every illegally introduced (or blocked) message. A detection of an attack with the aid of the techniques of the present disclosure may therefore be more reliable in some cases.

Thirdly, the expense of the configuration of a device for detecting the possibility of an intrusion into a bus system may be further reduced. In some cases, the number of messages for a component can be ascertained relatively easily and without additional effort. For instance, systems which use a transmitter identification may require every component to transmit a predefined number of messages during the configuration of the system for a transmitter identification. During the same time period, the predefined criterion of the present disclosure is able to be ascertained based on the time the respective component requires to transmit the predefined number of messages.

Fourthly, a detection of the possibility of an intrusion may be implemented relatively rapidly in some instances (e.g., if the time period during which the number of messages of a component is ascertained is kept short). This may be advantageous because countermeasures against an attack can be initiated without delay (and actually transmitted messages may be rendered harmless in some cases).

In the present disclosure, a few terms are used in a specific way.

A 'bus system' according to the present disclosure refers to any system in which a plurality of components is connected to a shared transmission path ('bus') and has the ability to transmit messages via the shared transmission path (e.g., in a serial or parallel manner). The use of a shared transmission path allows only one component in serial bus systems to (validly) transmit a message at any given time (or a certain plurality of components in parallel bus systems). The time periods of the transmission of messages are distributed according to a scheme that is known to all components. The bus system may be set up and operated according to a standard. Such standardized bus systems may include a CAN bus system, an Ethernet bus system, a FlexRay bus system, a MOST bus system, a LIN bus system, or some other bus system. In the following text, a CAN bus system (Controller Area Network bus system, also abbreviated to CAN bus) is sometimes used as an example. However, the techniques of the present disclosure are not restricted to CAN bus systems (except for aspects that relate to dedicated features of a CAN bus system). The bus system may also be a proprietary (i.e., non-standardized) bus system in other cases.

In the bus systems of the present disclosure, the connected components transmit data in the form of messages (also referred to as 'frames'). A 'message' in the present disclosure can be a datum which is set up according to a predefined pattern and includes control data and useful data transmitted by a component via the shared transmission path. The control data may include information which can be used for the transmission, authentication and/or validation of the message. A message may be an uninterrupted sequence of information (e.g., binary information) of a specific length (which is transmitted in this form or in a modified form via the shared transmission path of the bus system). When the bus system is in operation, a specific component is able to transmit a message or multiple messages, whereupon another component is able to transmit a message or multiple messages, etc.

A 'component' may be any device capable of transmitting messages via a bus system. A component (e.g., a control unit) has (at least) one processor, one memory, which stores software for the operation of the component (e.g., in the form of firmware), and one or more input and output interfaces (e.g., for the communication via the bus system and/or other networks and/or with sensors or actuators).

A component may be an embedded system, such as a (dedicated) control unit. An embedded system (e.g., a control unit) can be an electronic computer, which is embedded in the context of a higher-level system (e.g., of a vehicle) and (dedicatedly) assumes one or more monitoring open-loop or closed-loop control functions and/or is responsible in a dedicated manner for the form of the data or signal processing, for instance during the encrypting or decrypting, encoding or decoding or filtering.

In the present disclosure, a 'vehicle' is any device for transporting persons and/or goods. A vehicle may be a motor vehicle but also a rail vehicle, a watercraft, an aircraft, or a spacecraft.

BRIEF DESCRIPTION OF THE DRAWINGS

FIG. 2 is a flow diagram of the techniques according to example embodiments of the present invention.

DETAILED DESCRIPTION OF EXAMPLE EMBODIMENTS

Figure 3A:
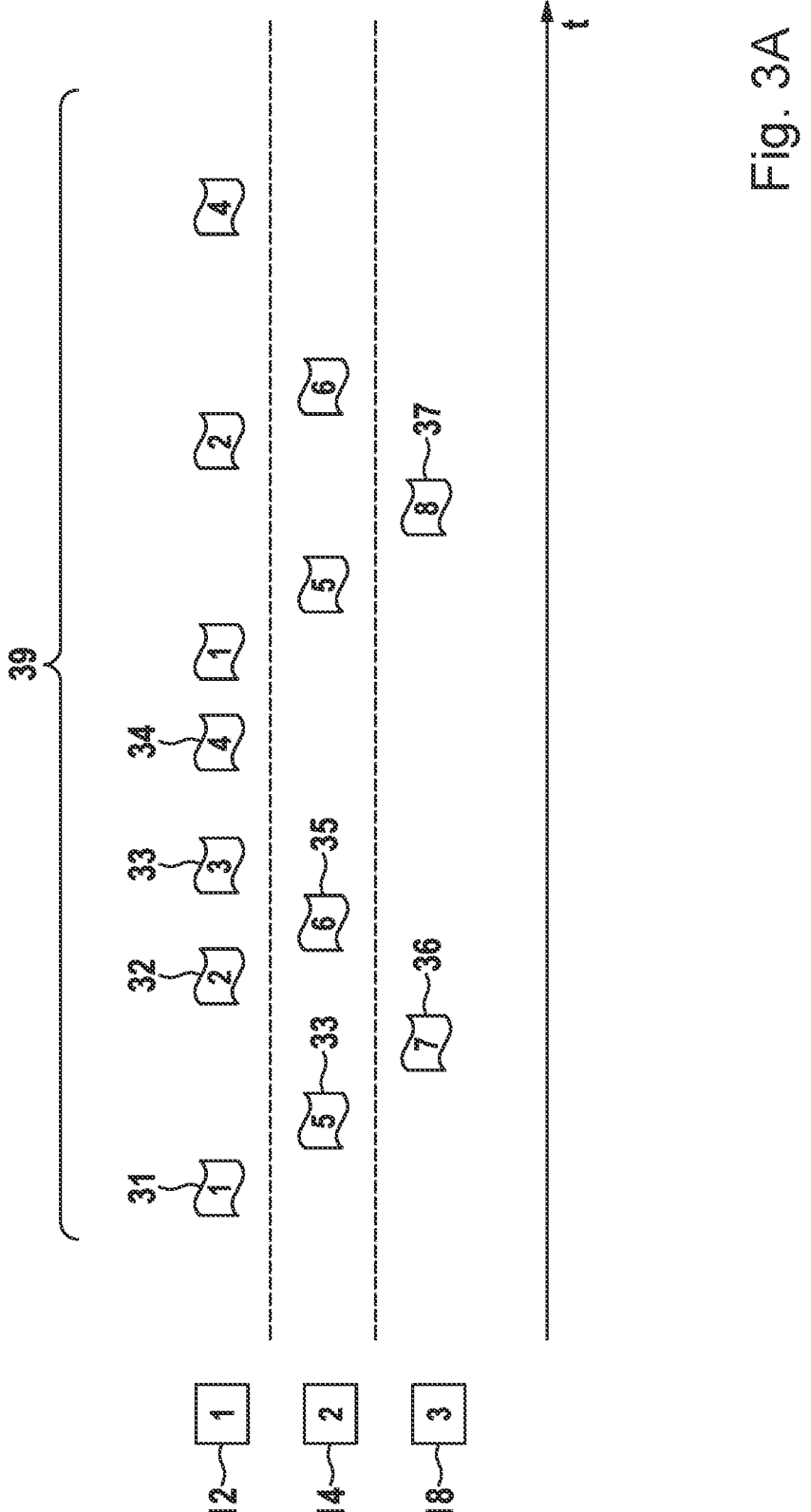
FIGS. 3A-3C are schematic transmission sequences of messages.
Figure 3B:
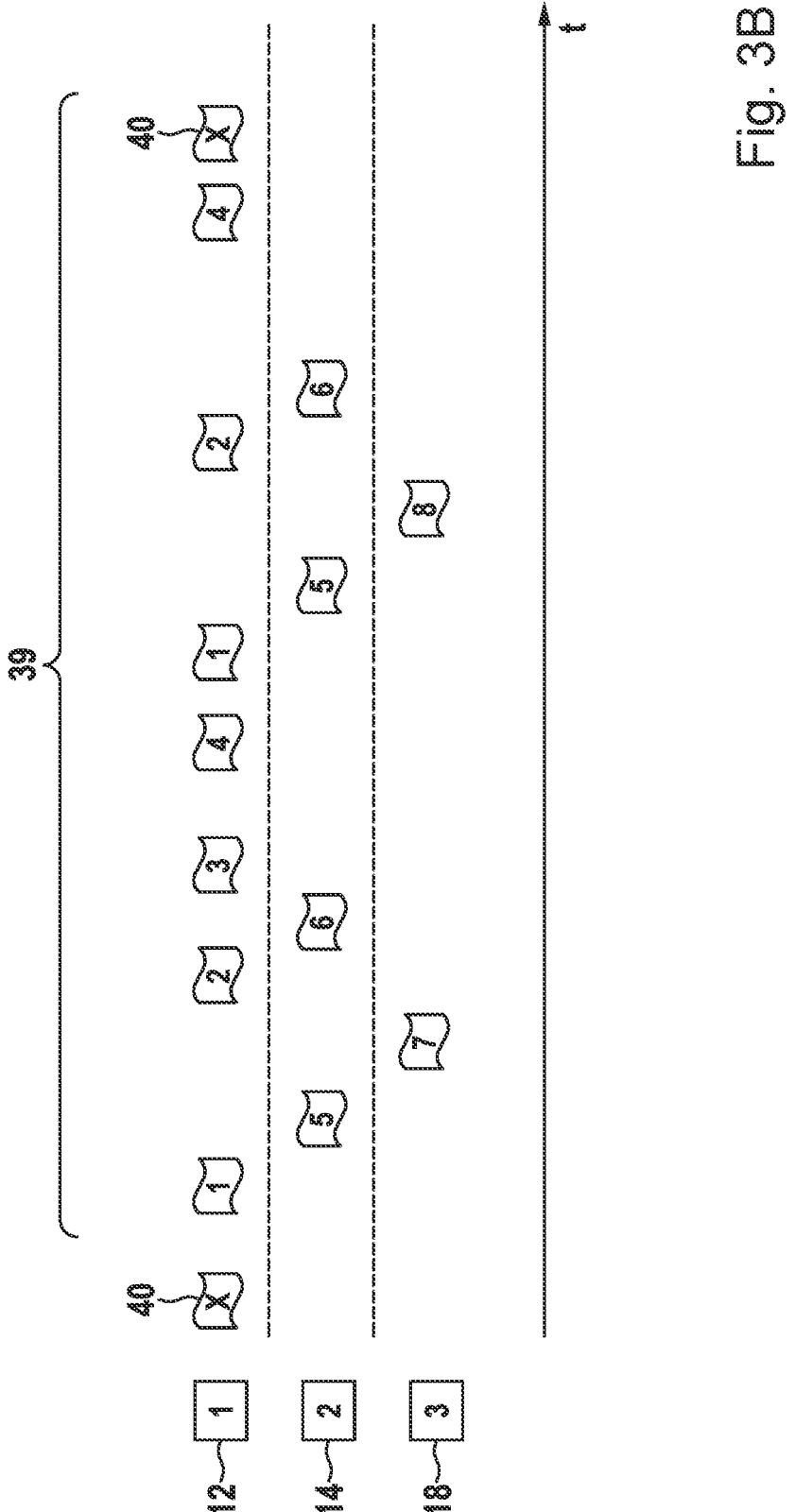
Figure 3C:
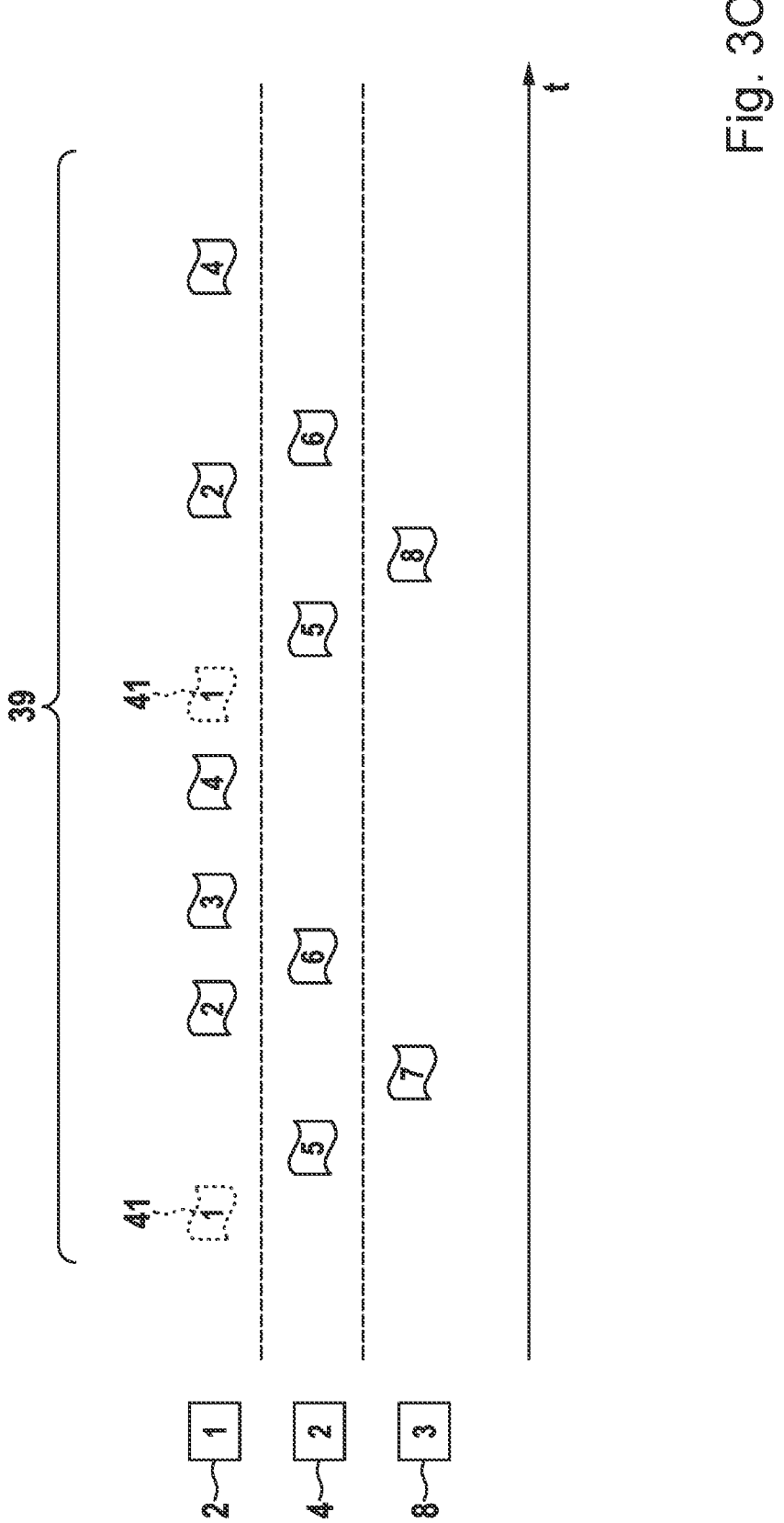

At the outset, the techniques for detecting the possibility of an intrusion into a bus system will be described with reference to FIG. 1 and FIG. 2. With reference to FIGS. 3A to 3C, further aspects of the criteria of the present disclosure are described in the following text.

Figure 1:
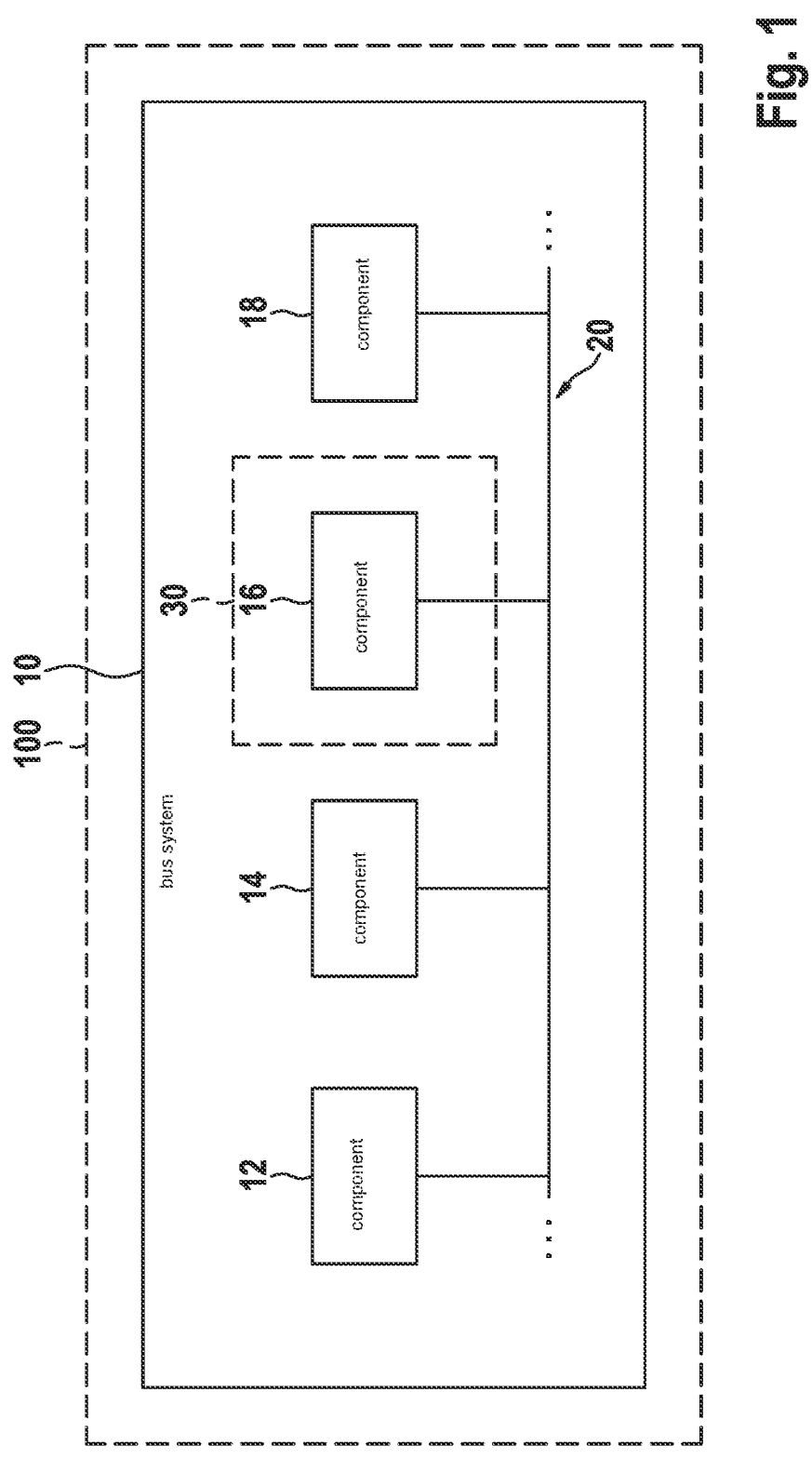
FIG. 1 schematically shows a bus system (in a device).

FIG. 1 schematically shows a bus system 10 (in a device 100).

FIG. 2 is a flow diagram of the methods 200 of the present disclosure.

Bus system 10 includes a plurality of components 12, 14, 16, 18 (such as more than 10, more than 50 or more than 100 components), which are able to transmit messages in bus system 10. The bus system may include a shared transmission path 20 for this purpose. In some examples, bus system 10 may be a CAN bus system (or a different bus system of the previously mentioned bus systems). In some examples, shared transmission path 20 may link the plurality of components 12, 14, 16, 18 in a linear (as shown in FIG. 1) or a star-shaped fashion.

One or more components 12, 14, 16, 18 may be embedded systems, e.g., control units. In some examples, a component 12, 14, 16, 18 may have a central processor and modules (e.g., actuators, sensors, etc.) connected thereto. Components 12, 14, 16, 18 may include a bus system control unit (e.g., a CAN controller, which receives messages from shared transmission path 20 or transmits messages onto shared transmission path 20). In some instances, components 12, 14, 16, 18 furthermore include a transceiver to convert messages in the messages into corresponding physical signals, which are able to be fed onto a shared transmission path 20 (for transmission), or to convert physical signals received from shared transmission path into a message (for receiving).

The control units may be a door control unit, an engine control unit, a control unit for the electrical power steering system, a man-machine interface, a drive train control unit, a seat control unit, a speed control unit, a telematics control unit, a transmission control module, a brake control module, or a battery management system. Two or more of these functions are also able to be combined to form a control unit (e.g., a drive train control unit and a transmission control module).

In some examples, device 100 may be a vehicle (such as a motor vehicle). In the following text, the techniques of the present disclosure are sometimes described using a vehicle as an example. However, the present disclosure is not restricted to vehicles.

In other examples, device 100 may be a robot. In yet other examples, the device may be an industrial machine or an industrial plant (for instance for the production, packaging, transport and/or inspection of a product or for carrying out a partial step in the production, packaging, transport and/or inspection of a product). In further examples, the device is a device 100 from the building technology sector (e.g., a security system or an elevator system). In some other examples, device 100 may be a medical device (such as a laboratory device). As a matter of principle, device 100 may be any device in which a bus system is used.

As illustrated in FIG. 2, a method 200 for detecting the possibility of an intrusion into bus system 10 includes an ascertainment 201 of a number of messages transmitted from a first component 12 of the plurality of components 12, 14, 16, 18 within a specific time period.

To ascertain 201 the number of messages, the messages transmitted in the bus system are allocated to a component, e.g., first component 12 (or any other component). In some examples, a message may carry a message identification which identifies the respective message as having been sent by a specific component 12, 14, 16, 18 (that is, messages having a specific message identification are transmitted only by one of the components such as the first component). The allocation of the message identification to the components must be known when the number is ascertained. The allocation now includes an ascertainment of the messages that include a message identification of first component 12. In addition or as an alternative, the messages may include a component identification (which directly identifies the component). It is then possible to read out the component identification when the number is ascertained. In this case, the allocation includes an ascertainment of the messages that include the component identification of first component 12. Moreover, a signature of first component 12 may be identified in the message in addition or as an alternative (that is, implicitly identify first component 12). The allocation includes an ascertainment of the messages which include a signature of first component 12. The signature, for instance, may be a voltage signature or some other characteristic that identifies a message has having been sent by first component 12.

The specific time period can be dimensioned differently and may be configurable in some examples (also dynamically configurable during the operation of device 100). A longer time period may immunize the method against intermittent fluctuations in the number of transmitted messages and/or may detect rarely transmitted messages as well. The predefined time period can have a variable length. In some examples, the predefined time period is longer than 100 ms (e.g., longer than 500 ms). In some examples, the predefined time period amounts to between 100 ms and five minutes (e.g., to between 200 ms and 1 s).

Ascertainment 201 is able to be carried out continuously. The techniques of the present disclosure are not restricted to ascertaining a number of messages for disjunctive predefined time periods. Instead, the ascertainment may be carried out in a flexible manner in some examples. In addition or as an alternative, the number of messages transmitted by a component 12, 14, 16, 18 can also be ascertained as a transmission frequency (that is, the number of messages in the predefined time period).

In addition, method 200 includes a determination 202 as to whether the ascertained number of messages in the specific time period satisfies a predefined first criterion. This may be accomplished in different ways, which will be described in greater detail in the further text in connection with FIGS. 3A-3C.

In some cases, the predefined criterion defines a number of messages to be expected within the predefined time period. The criterion is not satisfied if the ascertained number of messages deviates from the expected number of messages in the predefined time period. Within the framework of an attack, for instance, a number of additional messages of first component 12 is able to be transmitted onto a shared transmission path 20. This may increase the number of messages ascertained in the predefined time period. This increase is can be detected by comparing the actually transmitted messages to the expected number of messages.

The method furthermore includes detecting 203 the possibility of an intrusion if the number of messages does not satisfy the predefined first criterion. In some examples, the detection of the possibility may be realized by generating a corresponding signal. This signal (and the information included therein) is able to be further processed in different ways.

In the previous sections, the technique of the present disclosure was described based on an ascertainment of the number of messages of first component 12. In the same way, the present method is also able to be carried out for further components 14, 16, 18 of bus system 10.

In some examples, the method includes ascertaining a number of messages that are transmitted by a second component 14 of the plurality of components 12, 14, 16, 18 within a certain time period (which may be equal to or differ from the specific time period of first component 12); determining whether the number of messages in the specific time period satisfies a predefined second criterion, and detecting the possibility of an intrusion if the number of messages does not satisfy the predefined second criterion. In some examples, the intrusion can be detected if a possibility of an intrusion was detected for two or more components.

In some examples, a number of messages transmitted by the respective component 12, 14, 16, 18 in a specific time period is able to be ascertained for more than two (e.g., all) components of the plurality of components 12, 14, 16, 18 (such as three or more or ten or more), and it can be determined whether the respective number satisfies a predefined criterion.

The step of ascertaining 201 the number of messages (for a component or multiple components) may be implemented by a dedicated component which is connected to the shared transmission path 20. In some cases, the functionality is also able to be provided by one of components 12, 14, 16, 18 that is already connected to shared transmission path 20 in some other function (such as a component for an intrusion detection using techniques other than those of the present disclosure).

The step of determining 202 whether the ascertained number of messages in the specific time period satisfies a predefined first criterion is able to be performed by the same component that also carries out the step of ascertaining 201 the number of messages (for one or more component(s). In other cases, the step of determining 202 whether the ascertained number of messages in the specific time period satisfies a predefined first criterion may be carried out by a separate component (which is connected to the component carrying out the step of ascertaining 201 the number of messages (for one or more components) and receives the ascertained number of messages from there).

In the example of FIG. 1, a device 30 for detecting the possibility of an intrusion into a bus system is situated in a third component 16 of bus system 10. In this example, the steps of ascertaining 201 and determining 202 are carried out in third component 16. Third component 16 may be a dedicated component for carrying out these steps, possibly in connection with additional steps of the techniques of the present disclosure for detecting the possibility of an intrusion into a bus system (e.g., an embedded system) or it may be configured to carry out the steps of ascertaining 201 and determining 202, possibly in connection with further steps of the techniques for detecting the possibility of an intrusion into a bus system, in addition to other functions.

In some examples, a detection whether an intrusion has occurred may take place if the possibility of an intrusion was detected. For instance, it may be detected that an attack has taken place if a possibility of an intrusion was detected multiple times according to the techniques of the present disclosure (e.g., for a specific component). In other examples, an intrusion may be identified at the first detection of the possibility of an intrusion. In the present disclosure, the phrase "detecting that an intrusion has occurred" merely means that a device has checked predefined conditions and that these conditions have been satisfied. It may well be the case that the presence of an intrusion is detected even when no intrusion has occurred (e.g., because of an error or because the predefined conditions are satisfied for other reasons).

In addition to the methods for detecting the possibility of an intrusion into a bus system based on ascertaining the number of messages of the present disclosure, it is possible in some examples to carry out one or more of the aforementioned methods of the related art (e.g., an ascertainment of an interval between messages of the same type and a comparison of the ascertained interval to a reference value). The methods may be used to detect an intrusion in a more reliable manner (for instance only if two or more different methods identify a possibility of an intrusion) and/or to validate a result of the methods for detecting the possibility of an intrusion into a bus system based on the ascertainment of the number of messages.

If the possibility of an intrusion is identified and/or an intrusion is detected, the methods of the present disclosure may include the initiation 204 of one or more countermeasures.

In some examples, the countermeasure may include an ascertainment 206 of a component which is potentially affected by an intrusion. In some examples, this ascertaining may simply involve that a component for which a predefined criterion of the number of transmitted messages has not been satisfied is deemed to be potentially affected by the intrusion. In other cases, the ascertainment of a component which is potentially affected by an intrusion may include further analysis steps (e.g., a transmitter identification of messages to ascertain a component which is transmitting messages under the pretense of a false identity).

In some instances, a countermeasure may include an exclusion 207 of an ascertained component from the transmission of further messages. To this end, the respective component is able to be decoupled from shared transmission path 20 and/or be switched off. In some examples, a functionality of the respective component may be assumed by a different component. As an alternative or in addition, the state of the respective component is able to be analyzed (e.g., in order to detect a part of the component that has been manipulated by an intrusion), and a software update of the respective component may possibly be carried out (to remedy the intrusion).

In addition or as an alternative, other components of bus system 10 and/or of device 100 are able to be informed of the identity of an ascertained component. The content of messages that were received from the respective component may then be treated separately by these other components (e.g., ignored or subjected to further checks before being processed).

In addition or as an alternative, messages that are transmitted by an ascertained component may be ignored or handled separately in some other manner. This allows the component to continue the transmission of messages, but an adverse effect on the functionality of the bus system may be lessened in some instances. A functionality of the respective component can then be taken over by another component.

In addition or as an alternative, one or more messages transmitted by an ascertained component may be invalidated. In some instances, the invalidation can include the modification of the message (e.g., by modifying one or more bits of the message) so that components of the bus system no longer interpret the message as a valid message.

Additionally or as alternatively, the countermeasure may include recording the intrusion (e.g., generating a log entry that records the intrusion).

The countermeasures may be initiated or carried out by the same component that has identified the possibility of an intrusion and/or that has determined an intrusion, or it may be undertaken by some other component.

In some cases, method 200 may furthermore include the definition 205 of the predefined criterion at a specific instant during the operation of bus system 10. Within the framework of this step, it is possible to ascertain how many messages a component (such as first component 12) transmits within a specific time period (i.e., a reference value of the transmitted message of the component). This information may then be used to define a predefined criterion.

For instance, defining 205 the predefined criterion may take place in an initialization or start phase of one of components 12, 14, 16, 18 of bus system 10, of bus system 10, or of device 100.

In some examples, defining 205 may be carried out during an initialization of a transmitter identification process in bus system 10 during which first component 12 transmits messages via shared transmission path 20. For instance, this may include ascertaining a number of messages that the first component 12 transmits via shared transmission path 20 during the initialization of the transmitter identification process. In this case, first component 12 may be induced to transmit a specific number of messages anyway (e.g., in order to initialize a model of the transmitter identification process). The number of messages may correspond to a number transmitted during the operation. On this basis, the predefined criterion is able to be determined (e.g., an expected number of messages within a time period). This makes it possible to reduce a configuration expenditure of a device 30 for detecting the possibility of an intrusion into a bus system insofar as no or only a minor additional communication on the bus system may be required for the configuration.

As an alternative or in addition, the defining 205 of the predefined criterion may be carried out at other points in time when the first component transmits messages for a specific time or transmits a specific number of messages.

In the following sections, further aspects of the techniques for detecting the possibility of an intrusion into a bus system of the present disclosure will be described with reference to FIG. 3A to FIG. 3C By way of example, FIG. 3A shows a sequence of messages 31-38 that is transmitted by components 12, 14, 18 of a bus system (the x-axis illustrates the transmission time of the messages while messages farther to the right are transmitted at a later time). A line includes the messages transmitted by a specific component in each case.

Components 12, 14, 18 may transmit different types of messages (in FIG. 3A, the message types are identified by the numbers 1 through 8; first component 12, for example, transmits messages of four different types "1", "2", "3" and "4" during the illustrated time period). Messages of the same type are sometimes also referred to as "same messages" in the present disclosure. This does not mean that the content of the message, in particular a payload, is completely identical. Instead, a message of the same type may have a different payload and/or may differ in some other way. Messages of a type in some examples may have a specific payload or a specific function. For instance, a message of a certain type can include a measured value of a specific sensor (e.g., an engine speed, a pedal position, a fuel pressure, or a temperature of a component) or it may include a control value of a specific actuator (at a point in time). Although the measured value or the control value may change, the respective value is transmitted in a message of the same type.

In some examples, the messages may have a message identification which identifies the message as a message of a specific type (the message, for instance, may include a field that shows a message identification). In a CAN bus system, the message identification may be an identifier segment in an arbitration field of a message. In other examples, the type of the message may implicitly result from the message (that is, information pertaining to a message type is transmitted implicitly). As can be gathered from FIG. 3A, a component may be configured for the transmission of multiple different types of messages (e.g., more than three different types, more than ten different types or more than 50 different types).

The transmission of the messages of a type may be carried out periodically (at a fixed or variable period) or else in response to the occurrence of specific events.

As can be gathered from FIG. 3A, first component 12 transmits seven messages of four different types 31, 32, 34, 38 in a specific time period 39 (the number has been selected merely as an example, the number may be much higher in real bus systems, depending on the length of time period 39).

This number of messages in specific time period 39 forms the basis of the techniques of detecting the possibility of an intrusion into a bus system.

In some examples, the ascertaining of the messages in time period 39 may include counting all messages 31, 32, 34, 38 that are transmitted in time period 39 by first component 12. In other examples, only the number of a subset of messages that are transmitted by first component 12 during time period 39 may be counted. For instance, one or more types of messages 31, 32, 34, 38 transmitted within time period 39 are able to be ignored when ascertaining the number of messages 31, 32, 34, 38 (and only the number of the other two or more types of messages in time period 39 be ascertained). In some examples, one or more types of messages that are ignored within the framework of the techniques of the present disclosure for detecting the possibility of an intrusion into a bus system may be configurable (for instance via an interface of a device for detecting the possibility of an intrusion into a bus system or by programming a device for detecting the possibility of an intrusion into a bus system). In some cases, this may increase a flexibility of the techniques for detecting the possibility of an intrusion into a bus system of the present disclosure.

In still other examples, the ascertained number of messages may include a weighted number of messages which are transmitted by first component in time period 39. For example, different types of messages may be considered in the ascertainment of the number at different weighting factors (the ignoring of certain types of messages described in the previous section can also be seen as weighting at a weighting factor of zero). In this case, the ascertained number does not strictly correspond to the number of messages but constitutes a meta value as a function of the number (which basically increases with the number of messages, albeit not necessarily at a rate of one per transmitted message). The weighting factors may be configurable in some examples (for instance via an interface of a device for detecting the possibility of an intrusion into a bus system or by programming a device for detecting the possibility of an intrusion into a bus system). The flexibility and/or efficiency of the techniques for detecting the possibility of an intrusion into a bus system of the present disclosure may be increased through the weighting of the types of messages in some cases. For example, particularly relevant types of messages (e.g., those that are especially safety-relevant) are able to be given a greater consideration.

FIG. 3A shows a situation during the operation of a device for detecting the possibility of an intrusion into a bus system where no intrusion is present (which means that none of components 12, 14, 16, 18 is manipulated). As already mentioned, the number of transmitted messages for one or more components 12, 14, 18 during time period 39 can now be ascertained (the messages for each component can be counted, for instance).

It may subsequently be checked whether the ascertained number of messages in the specific time period satisfies a predefined first criterion.

This is able to be realized in a variety of ways. In general, the predefined criterion may be defined on the basis of a reference value for the ascertained number of messages transmitted in time period 39, or a derived variable can be defined (and thus include the verification whether an ascertained number or a derived variable corresponds to the reference value or the derived variable).

For example, as mentioned earlier, the verification may include a direct comparison of a number of messages to an expected number. In this case, the predefined criterion may be whether an ascertained number of messages corresponds to an expected number of messages.

In other example, a transmission frequency is able to be calculated from the ascertained number of messages of a component in time period 39 (e.g., as an ascertained number of messages per time period). In this case, the predefined criterion may be whether an ascertained transmission frequency of messages of the component corresponds to an expected transmission frequency of messages of the component.

In still other examples, it is possible to calculate an evaluation variable from the ascertained number of messages of a component in time period 39 (which, for instance, also incorporates other information pertaining to component 12, bus system 10, device 100 and/or the environment of device 100). In this case, the predefined criterion may be whether the calculated evaluation variable deviates from an expected evaluation variable. For example, the evaluation variable may be a variable that reflects an average and/or a deviation from an average of messages transmitted by first component 12.

In some examples, the reference value is a range (e.g., a range having an upper and a lower limit which differs from zero and infinite, or a range which is open toward the top or the bottom). For instance, a range of the number of messages that may be expected to be transmitted during time period 39 is able to be given. Similar ranges may be given for the transmission frequency and the evaluation variables. In some instances, this makes it possible to ensure that certain fluctuations in the number of transmitted messages are taken into consideration in the verification (e.g., a component may sometimes transmit more or fewer messages during a normal operation within a time period). The dimension of the range may also be configured to ensure a more or less sensitive detection of the possibility of an intrusion (but this may result in an increase in the number of cases in which an intrusion is wrongly detected or in the number of cases in which intrusions are missed). Upper and lower limits of the ranges are able to be adjusted when configuring the device for detecting the possibility of an intrusion into a bus system.

In some examples, the predefined criterion can be static during the operation of the bus system (that is, the predefined criterion may not change). In other examples, the predefined criterion may vary over time (for instance in response to certain events). For example, under certain circumstances (e.g., an emergency situation), a component may transmit more messages than under other circumstances. The device for detecting the possibility of an intrusion into a bus system of the present disclosure may appropriately adapt the predefined criterion in these cases (e.g., increase an expected number of messages of the component). A similar approach may be provided for components which become active and transmit messages only occasionally. In general, the predefined criterion may be whether a distribution of the transmitted messages of a component corresponds to an expected distribution within a period of time.

The predefined criterion may include a single criterion, which is evaluated in the framework of the verification (e.g., in the framework of an individual verification as to whether an ascertained number of messages corresponds to an expected number of messages). In other examples, the predefined criterion may include two or more partial criteria that are evaluated within the framework of the verification (e.g., whether a number of messages of the first type corresponds to a first expected number of messages and whether a number of a second type of messages corresponds to a second expected number of messages). The criterion may be satisfied if two or more (e.g., all) partial criteria are satisfied.

As already mentioned, FIG. 3A shows a normal operation of a bus system 10. In this case, the ascertained number of messages 31, 32, 34, 38 transmitted by first component 12 satisfies the predefined criterion (the ascertained number corresponds to the expected number, for example). A device for detecting the possibility of an intrusion into a bus system is unable to detect an intrusion in such a case. A corresponding signal is able to be output, for instance. In other examples, no signal will be output.

FIG. 3B now shows a situation in which an intruder transmits additional messages 40, 41 within predefined period of time 39 through first component 12. Once again, the device for detecting the possibility of an intrusion into a bus system is able to ascertain the number of transmitted messages 31, 32, 34, 38, 40, 41 and verify whether the ascertained number in time period 39 satisfies a predefined criterion. The additional messages (often considerably more than two in real systems) may now increase the number of transmitted messages to such an extent that the predefined criterion is not satisfied. The possibility of an intrusion is then able to be detected and appropriate countermeasures may be taken, as the case may be.

FIG. 3C shows a further situation in which an intruder prevents the transmission of messages 31 that were meant to be transmitted by first component 12 during the predefined time period 39. Once again, the device for detecting the possibility of an intrusion into a bus system can ascertain the number of transmitted messages 32, 34, 38, 40, 41 and check whether the ascertained number during time period 39 satisfies a predefined criterion. The missing messages (in real systems frequently considerably more than two) may now reduce the number of transmitted messages to such a degree that the predefined criterion is not satisfied. The possibility of an intrusion may then be determined, and appropriate countermeasures possibly be taken.

As previously mentioned repeatedly, the device for detecting the possibility of an intrusion into a bus system is able to be realized in any suitable hardware. For instance, the device for detecting the possibility of an intrusion into a bus system may encompass at least one processor as well as a memory which stores instructions that when executed by the processor, induce the device for detecting the possibility of an intrusion into a bus system to execute the steps of the method of the present disclosure.

Moreover, the present invention relates to a computer program which is designed to carry out the steps of the method for detecting the possibility of an intrusion into a bus system.

The present invention also relates to a memory module, which includes the computer program according to the present invention.

The present invention also relates to a data signal that includes the computer program according to the present invention.

What is claimed is:

1. A method for detecting a possibility of an intrusion into a bus system, the bus system including a plurality of components which are able to transmit messages in the bus system, the method comprising the following steps:

ascertaining a number of one or more messages which are transmitted by a first component of the plurality of components in a specific time period, the ascertaining being performed by counting the number of the one or more messages in the specific time period;

determining whether the ascertained number of messages in the specific time period satisfies a predefined first criterion;

detecting the possibility of an intrusion based on the number of messages not satisfying the predefined first criterion; and dynamically adapting the predefined first criterion in response to a change in an operating state, wherein the predefined first criterion is defined during an initialization of a transmitter identification process in the bus system during which the first component transmits messages via a shared transmission path.

2. The method as recited in claim 1, wherein the predefined first criterion defines an expected number of messages in the predefined time period.

3. The method as recited in claim 2, wherein the predefined first criterion is not satisfied when the ascertained number of messages deviates from the expected number of messages in the specific time period.

4. The method as recited in claim 1, wherein the messages include messages of at least two different types, and every type of messages is provided with a unique identification.

5. The method as recited in claim 1, further comprising:

defining the predefined first criterion in an initialization or start phase of one of the components of the bus system, or the bus system, or a device which includes the bus system.

6. The method as recited in claim 1, further comprising:

determining whether an attack has occurred when the possibility of an intrusion was detected; and initiating a countermeasure when an attack has occurred.

7. The method as recited in claim 1, wherein the first component is an embedded system.

8. The method as recited in claim 7, wherein the embedded system is a control unit.

9. The method as recited in claim 1, wherein the bus system is a CAN bus system.

10. The method as recited in claim 1, the ascertaining being performed by counting only a subset of the number of the one or more messages that belong to one or more types in the specific time period and a remainder of the number of the one or more messages that do not belong to the one or more types being ignored by the counting.

11. A device configured to detect a possibility of an intrusion into a bus system, the device comprising:

a hardware processor; and a memory that stores instructions that when executed by the processor cause the device to:

ascertain a number of one or more messages which are transmitted by a first component of the plurality of components in a specific time period, the ascertaining being performed by counting the number of the one or more messages in the specific time period;

determine whether the ascertained number of messages in the specific time period satisfies a predefined first criterion;

detect the possibility of an intrusion based on the number of messages not satisfying the predefined first criterion; and dynamically adapt the predefined first criterion in response to a change in an operating state, wherein the predefined first criterion is defined during an initialization of a transmitter identification process in the bus system during which the first component transmits messages via a shared transmission path.

12. The device as recited in claim 11, the ascertaining being performed by counting only a subset of the number of the one or more messages that belong to one or more types in the specific time period and a remainder of the number of the one or more messages that do not belong to the one or more types being ignored by the counting.

13. A bus system, comprising:

a plurality of hardware components which are able to transmit messages via a communication line of the bus system; and at least one device configured to detect a possibility of an intrusion into the bus system, the device comprising:

a hardware processor; and a memory that stores instructions that when executed by the processor cause the device to:

ascertain a number of one or more messages which are transmitted by a first component of the plurality of components in a specific time period, the ascertaining being performed by counting the number of the one or more messages in the specific time period, determine whether the ascertained number of messages in the specific time period satisfies a predefined first criterion, detect the possibility of an intrusion based on the number of messages not satisfying the predefined first criterion, and dynamically adapt the predefined first criterion in response to a change in an operating state, wherein the predefined first criterion is defined during an initialization of a transmitter identification process in the bus system during which the first component transmits messages via a shared transmission path.

14. The bus system as recited in claim 13, the ascertaining being performed by counting only a subset of the number of the one or more messages that belong to one or more types in the specific time period and a remainder of the number of the one or more messages that do not belong to the one or more types being ignored by the counting.

15. A non-transitory memory medium on which is stored a computer program for detecting a possibility of an intrusion into a bus system, the bus system including a plurality of components which are able to transmit messages in the bus system, the computer program, when executed by a computer, causing the computer to perform the following steps:

ascertaining a number of one or more messages which are transmitted by a first component of the plurality of components in a specific time period, the ascertaining being performed by counting the number of the one or more messages in the specific time period;

determining whether the ascertained number of messages in the specific time period satisfies a predefined first criterion;

detecting the possibility of an intrusion based on the number of messages not satisfying the predefined first criterion; and dynamically adapting the predefined first criterion in response to a change in an operating state, wherein the predefined first criterion is defined during an initialization of a transmitter identification process in the bus system during which the first component transmits messages via a shared transmission path.

16. The non-transitory memory medium as recited in claim 15, the ascertaining being performed by counting only a subset of the number of the one or more messages that belong to one or more types in the specific time period and a remainder of the number of the one or more messages that do not belong to the one or more types being ignored by the counting.

\* \* \* \* \*